Nov. 26, 1968      W. F. JACKSON ETAL      3,412,934
THERMOSTATIC CONTROL DEVICE
Original Filed Jan. 17, 1966

INVENTORS
WILBUR F. JACKSON
HENRY C. BRAUCKSIEK
BY Anthony A. O'Brien
ATTORNEY 3,412,934
THERMOSTATIC CONTROL DEVICE
Wilbur F. Jackson, Rolling Hills, and Henry C. Braucksiek, Buena Park, Calif., assignors to Robertshaw Controls Company, Richmond, Va., a corporation of Delaware
Continuation of application Ser. No. 521,179, Jan. 17, 1966. This application Nov. 14, 1966, Ser. No. 601,268
4 Claims. (Cl. 236—21)

ABSTRACT OF THE DISCLOSURE

A combined normal and abnormal temperature responsive control device for controlling fuel flow to burner apparatus has a rod and tube thermostat unit responding to normal temperature conditions for normal control of the fuel flow, a thermoelectric safety shut-off device responding to an unsafe condition for shutting off the fuel flow, and an abnormal temperature sensor responding to an abnormal temperature condition for abnormal control of the fuel flow. The abnormal temperature sensor includes a sealed enclosure disposed in the space between the rod and tube of the normal sensing thermostat unit with a bimetal switch in the sealed enclosure being electrically connected in the circuit of the thermoelectric safety shut-off device for actuation thereof in response to an abnormal temperature condition.

---

This application is a continuation of application Ser. No. 521,179 filed Jan. 17, 1966, now abandoned. The present invention relates to thermostatic control devices and in particular to such a device for preventing dangerously high temperature conditions in a heating appliance such as a hot water heater.

In modern heating appliances, such as domestic hot water heaters, it is standard practice to control a supply of fuel to a main burner and to a pilot burner, with the main burner flow being thermostatically controlled and the pilot burner flow being controlled by a thermoelectric safety device that shuts off flow to both burners. The thermoelectric safety device conventionally includes a valve member operatively associated with an armature that is biased to a valve closing position but is retained in a valve opening position when an electromagnet is energized by a thermocouple responding to the flame at the pilot burner; the voltage generated by the thermocouple is great enough to hold the armature in its valve open position but is not great enough to attract the armature, so reset means is utilized to move the biased armature against the electromagnet. As long as the electromagnet is energized, the main burner flow is thermostatically controlled as by a rod and tube type thermostat.

Explosions from dangerously high temperatures being developed in the hot water tank have presented a problem which has been approached by the prior art. For example, U.S. Patent No. 2,781,977 includes a lower cycling thermostat and a thermostatic switch that is attached to the upper exterior of the hot water tank and is connected in series with the thermoelectric circuit. While this arrangement presents some protection against abnormal temperature conditions, it includes certain disadvantages such as cost of installation and being responsive only to the temperature at the top of the hot water tank.

It is, therefore, an object of the present invention to incorporate a separate thermal sensor of the bimetal type in the same structure as the rod and tube thermostat in a control device.

Another object of this invention is to mount an over-temperature responsive bimetal switch means between the rod and tube of a normal temperature responsive thermostat of a control device in such a manner as to be substantially unaffected by vibrational effect of such thermostat.

It is another object of this invention to construct a bimetal switch assembly into a compact, simple sealed unit for insertion between the rod and tube of a thermostat unit.

A further object of the present invention is to control the circuit of a thermoelectric safety means in response to an overtemperature sensing bimetal switch means that is integrated with the normal temperature sensing means of a control device.

In accordance with the present invention, a thermostatic control device includes a casing having inlet and outlet means with a flow passage therebetween, control means in the passage movable between controlling positions, normal temperature sensor means carried by the casing, and including a rod and tube thermostat unit, an operative connection between the normal temperature sensor means and the control means for moving the same between its controlling positions, thermoelectric means including safety shut-off means in the passage and an electromagnetic device adapted to be energized for holding the shut-off means in an open position, thermoelectric circuit means for energizing the electromagnetic device, and an abnormal temperature sensor assembly including a sealed enclosure disposed in the rod and tube thermostat unit with bimetal switch means electrically connected in the circuit means for deenergizing the electromagnetic device in response to a predetermined abnormal temperature condition.

Other objects and advantages of the present invention will become apparent from the following description of a preferred embodiment, taken in connection with the accompanying drawings wherein.

Figures 1, 3, 4:
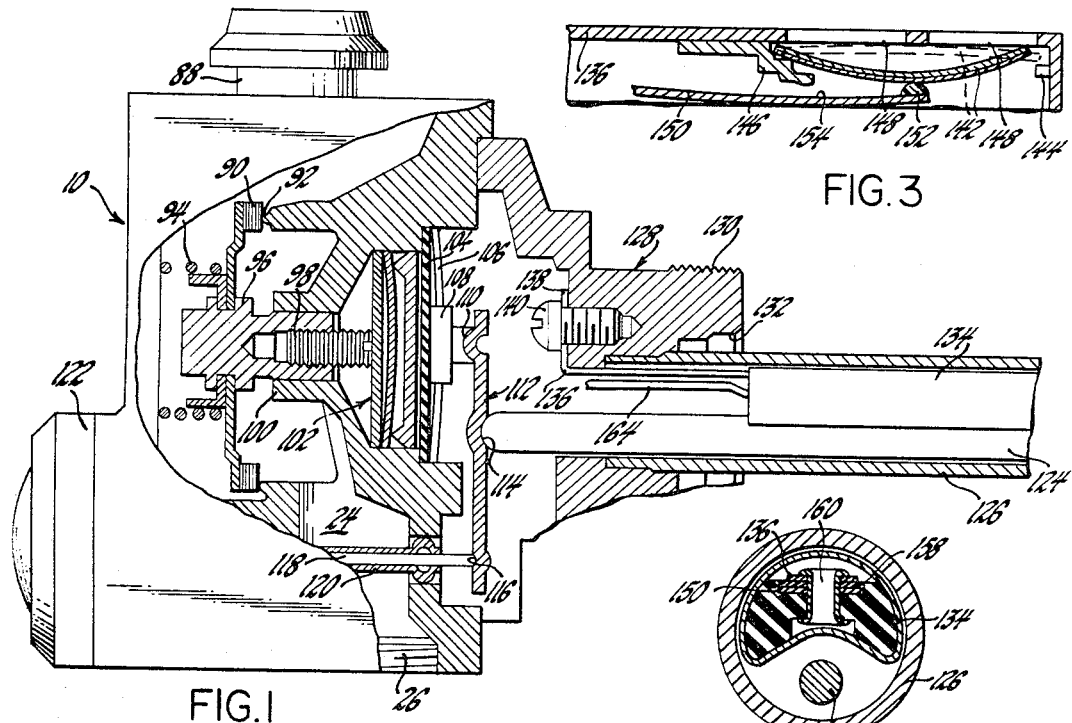
FIG. 1 is a side elevation with parts broken away and parts in section of a control device embodying the present invention.
FIG. 3 is an enlarged elevation view of a detail of FIG. 1.
FIG. 4 is a cross section taken along the line 4—4 of FIG. 2.
Figures 5, 6:
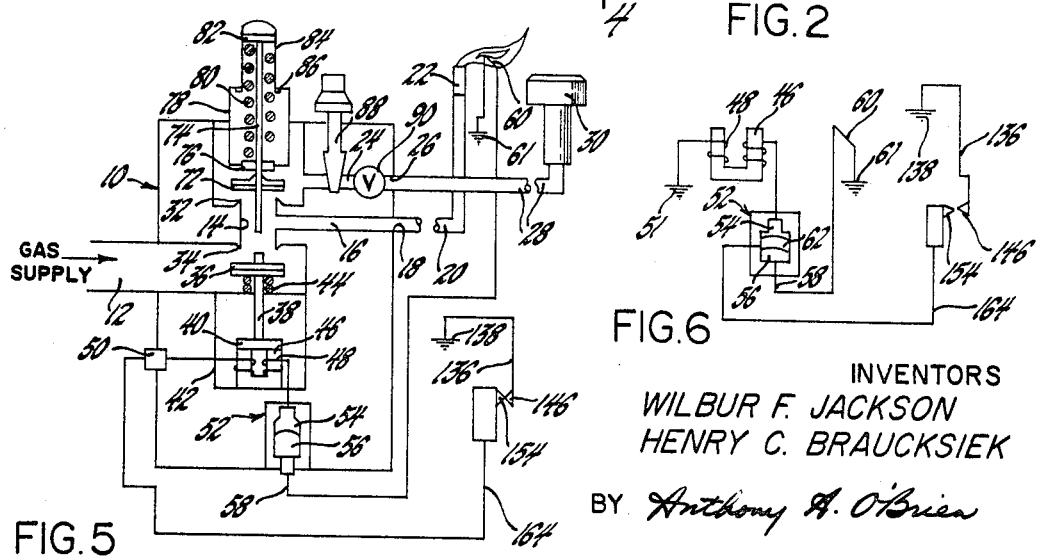
FIG. 5 is a schematic diagram of a fuel burner control system embodying the device of FIG. 1.
FIG. 6 is a schematic wiring diagram of a modification of FIG. 5.

As is illustrated in FIGS 1 and 5, the control device includes a casing 10 having inlet port 12 for receiving fuel from a gas source and communicating with a common internal passage 14 from which a pair of branch passages are controlled. One branch passage defines a pilot flow passage 16 leading to a pilot flow outlet port 18 which communicates with a conduit 20 for supplying fuel to a pilot burner 22; the other branch passage defines a main flow passage 24 leading to a main flow outlet port 26 which communicates with a conduit 28 for supplying fuel to a main burner 30.

The pilot flow passage 16 communicates with the common passage 14 intermediate its opposite ends which define a downstream valve seat 32 and an upstream valve seat 34 that is controlled by thermoelectric safety means. As is shown in FIG. 5, the thermoelectric safety means includes a safety shut-off valve member 36 movably disposed for cooperation with the valve seat 34. The valve member 36 is fixed to one end of an armature stem 38 which has its other end fixed to an armature 40 located in a fixed magnet housing 42 so that the stem 38 is slidably disposed relative to the housing 42. A coil spring 44 surrounds one end of the armature stem 38 and is mounted in compression between the end of the magnet housing 42 and the rear surface of the valve member 36 which is thus biased to a closed position against the valve seat 34. The valve member 36, stem 38 and armature 40 reciprocate as a unit between released and attracted positions relative to fixed electromagnetic means in the form of a generally U-shaped magnet core 46 and an electric coil 48 wound thereon. The magnet core 46 is secured in the magnet housing 42 by any suitable means and the energizing coil 48 has one end connected to an insulated connector 50 and its other end connected to a thermocouple cable connector 52.

The thermocouple cable connector 52 includes a seat member 54 having one end connected to the lead of coil 48 and its other end provided with an arcuate seat and a head member 56 having one end provided with a conforming arcuate head and its other end connected to a thermocouple cable 58. The thermocouple cable 58 is connected to the thermocouple 60 which is positioned in the flame of the pilot burner 22 and which has its other lead connected to a ground terminal 61.

The downstream valve seat 32 is controlled by combined reset and valve means which includes a valve member 72 carried adjacent one end of a reset stem 74. Such one end of the stem 74 is disposed for movement through the passage 14 to engage the safety valve member 36. The opposite end of the stem 74 extends through a sealing collar 76 on a plunger housing 78, in which a coil spring 80 encircles the stem 74 and is mounted in compression between the collar 76 and a disc 82 on the end of the stem 74. The stem 74 is retained in the housing 78 by means of a hollow push button 84 which receives the stem disc 82 and which includes an annular bottom flange 86 engaging the housing wall surrounding an opening therefor.

The main flow of fuel from the valve set 32 is controlled by a manually operable on-off valve 88 which may be a conventional tapered plug cock disposed in the main flow passage 24. Downstream of the tapered valve 88, the main flow of fuel is thermostatically controlled by a valve 90 which is operatively disposed in the main flow passage 24 just ahead of the main outlet 26.

As is shown in FIG. 1, the wall defining the main flow passage 24 is provided with an annular valve seat 92, toward which the valve disc member 90 is biased by a coil spring 94 mounted in compression between the surface of valve member 90 and an internal wall surface of the casing 10. A valve stem 96 has one end suitably connected to valve member 90 and a free end with an adjustable set screw 98 projecting through a bushing 100 formed in a rear wall of casing 10 to extend into engagement with actuating means 102. The actuating means is a conventional snap acting mechanism in which a clicker disc moves from an inoperative to an operative position through an over center position with a snap action in response to an applied operating force. The snap acting actuator means 102 is retained in an exterior recess formed in the rear wall of casing 10 by means of a seal-retainer assembly including a diaphragm seal 104 and a bowed washer 106 which is pressed fitted into the exterior recess. The operating force is applied by means of an operating button 108 extending through the opening of the washer 106 to engage the diaphragm seal 104.

The operating button 108 abuts a suitable projection 110 formed adjacent one end of an operating lever 112 which has an intermediate recess 114 receiving the rod end of a rod and tube type thermostat; a recess 116 formed adjacent the other end of the operating lever 112 receives the end of an adjusting shaft 118. The adjusting shaft 118 is axially movable in a sleeve 120 which extends across the passage 24 and sealed at both ends; the opposite end of the shaft 118 abuts an adjusting screw (not shown) which is threaded through the front wall of casing 10 and which carries a temperature selection knob 122 on its external end. With such an arrangement it is now apparent that rotation of the temperature selection knob 112 through a selective range of temperature settings will change the relative position of the operating lever 112 whereby the temperature at which the rod and tube thermostat effects actuation of the snap acting mechanisms 102, will be determined by the present position of the lever 112.

The thermostat for actuating the lever 112 is a rod and tube type in which a rod 124 of relatively non-expandable material, such as Invar, is longitudinally disposed off center in a tube 126 of relatively expandable material, such as copper. The free ends of the rod 124 and tube 126 are integrated by any suitable means such as a hollow bolt (not shown) disposed in annular space between the rod and tube and threadedly engaging both the rod and tube; the mounting end of tube 126 is secured as by threads to a mounting shank 128 which is attached to the rear wall of casing 10 as by threaded bolts (not shown). The end of mounting shank 128 includes external threads 130 for threading the assembly through the wall of a hot water tank (not shown) and an internal recess 132 coextensive with the tube 126; with such arrangement, substantially the entire length of the tube 126 is disposed in the hot water resulting in a more accurate and faster response of the rod and tube assembly.

Figure 2:
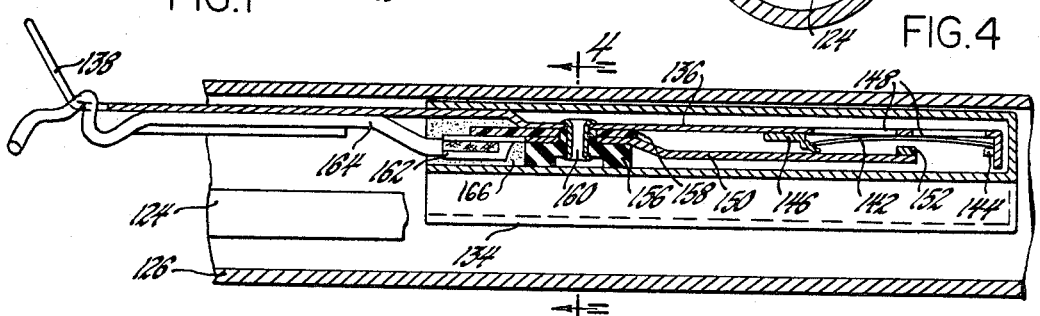
FIG. 2 is a side elevation of a detail of FIG. 1 with parts broken away and parts in section.

As is illustrated in FIG. 2, the abnormal temperature sensor assembly includes a kidney shaped cylindrical enclosure 134 of good heat conducting material, which houses a bimetal switch means adjacent its closed end. A switch bracket 136 made of electrical conductive material has a portion extending out of the opened end of the enclosure 134 and terminating in a ground terminal 138 which is apertured to receive a screw 140 that is threaded into an internal wall of the mounting shank 128. The enclosed end of conductor bracket 136 defines a rectangular housing for a bimetal snap leaf 142.

In the enlarged view of FIG. 3, the bimetal snap leaf 142 suspended at its ends which engage a housing tab 144 and an offset contact member 146 which is welded to the housing portion of bracket 136. The housing portion has a pair of slotted openings 148 on its top to facilitate freer passage of radiant heat to the bimetal snap leaf 142. The snap leaf 142 is constrained between the tab 144 and the offset contact tab 146 in a position approaching a flattened condition (dashed lines in FIG. 3) in order to lessen the switch space requirements; the side walls of the bracket housing portion assist in holding the snap leaf 142 in position. The snap leaf 142 is dished with its high expansion side on the lower side as shown so that on heating it will snap over center reversing its dish at a temperature which can be established and controlled by such factors as bimetal deflection rate, thickness, dish and heat treatment.

A lever blade 150 made of conductive spring material has an insulator button 152 on its free end which is normally biased toward the center of the bimetal snap leaf 142; a contact portion 154 of the blade 150 cooperates with the downward extending portion of contact 146 to open and close the circuit. The insulator button 152 thus acts to pick up the overcenter snap of the snap leaf 142 to open the electrical contact between contact portion 154 and contact portion 146 at the temperature at which the bimetal snap leaf 142 is designed to snap over center. When the bimetal snap leaf 142 snaps over center, the center of the snap leaf 142 pushes conductor blade 150 downward by hitting the insulator button 152 causing the contact portions 146 and 154 to open. As is illustrated in FIG. 2, adjacent its other end, the conductor blade 150 is offset and disposed on an insulating block 156; an insulating strip 158 and the adjacent portion of the conductor bracket 136 are secured to the insulating block 156 by a rivet 160. The end of the conductor blade 150 has opposed arcuate portions 162, which are crimped around the wire end of a conductor 164. The open end of the cylindrical member 134 is sealed with potting compound 166 through which the conductors 164 and 136 protrude.

The above arrangement defines a unitary assembly which can be easily inserted in the space between the offset rod 124 and tube 126. Inasmuch as the cylindrical housing 134 is kidney shaped in cross section, the sealed enclosure presents a large surface area adjacent the copper tube 126 for good heat transfer. Furthermore, the bimetal switch leaf 142 is disposed in the tube 126 so that its switching movement is perpendicular to the movement of the rod 124 and tube 126; thus, the snap leaf 142 is not subject to the vibrations caused by the rod and tube and the snap mechanism 102 as it snaps over center.

To place the system of FIGS. 1 and 5 in operation, the manual valve 88 is rotated to an on position and the temperature setting dial 122 is rotated to a selected temperature, e.g., 140° F. for conventional hot water heaters. The reset button 84 is manually depressed whereby the valve member 72 is closed on valve seat 32 to prevent any fuel flow through the main flow passage 24 and whereby the reset stem 74 moves the valve member 36, stem 38 and armature 40 as a unit against the bias of coil spring 44 to an attracted or valve open position permitting a fuel flow through the pilot flow passage 16 to the pilot burner 22 where it is ignited as by a match. As soon as the thermocouple 60 is heated sufficiently by the pilot burner flame to energize the holding electromagnetic means, core 46 and coil 48, the push button may be released whereby the armature 40 is held in its attracted position and both valve seats 32 and 34 are open. Inasmuch as the rod and tube thermostat is in its contracted state, the valve member 90 is open, permitting fuel flow to the main burner 30 which is ignited by the flame of the pilot burner 22.

As the water temperature increases, the tube 126 expands and, since the tube 126 is fixed at its inner end to the mounting shank 128, the tube expands longitudinally in the direction away from the mounting shank 128; the non-expanding rod 124 is pulled to the right, as viewed As the water temperature increases, the tube 126 ex- in FIG. 1, by the expanding tube 126 thus decreasing the applied force on the operating lever 112. When the water temperature reaches 140° F., the applied force on the operating button 108 is reduced to the point where the snap mechanism 102 returns to its position shown in FIG. 1 permitting the valve member 90 to be closed by its return spring 94; the main fuel flow is thus cut off and the main burner 30 is extinguished. A subsequent decrease in the water temperature, as when the hot water is drawn off and replenished with cold water, causes contraction of the tube 126 whereupon the main valve 90 is again opened. During normal operation, the main burner 30 will be cycled thermostatically as outlined above to maintain the water temperature at 140° F.

Should the flame at the pilot burner 22 be extinguished from any cause, the thermocouple 60 will cool and the thermoelectric current to the coil 48 will cease; thereupon the armature 40 will be released from the magnet core 46 under the bias of the coil spring 44, which closes the valve member 36 on the valve seat 34 to effect 100% shut off of any fuel flow. In order to place the system in operation again, the resetting procedure outlined above must be repeated.

In accordance with the present invention, the thermostatic device is integrally provided with a separate thermally responsive means to prevent excessively high water temperature that could cause explosion of the hot water tank. In the event the water temperature increases to a dangerously high temperature, e.g., in the range of above 190° F. due to some malfunction which keeps the main burner in operation, the bimetal snap leaf 142 snaps downwardly to separate from the contact 154 from the contact 146. The bimetal snap leaf 142 may be designed to snap at other critical temperatures, depending on the type of the heating appliance and its operating characteristics.

When the contact 154 is mated with the contact 146, the thermoelectric circuit in FIG. 5 may be traced as follows: from ground 61 through the thermocouple 60, the conductor 58, the connector 52, the coil 48, the connector 50, the conductor 164, the contact 154, the contact 146, and the conductive bracket 136 to the grounding terminal 138. When the bimetal leaf 142 moves the contact 154 away from the contact 146, the thermoelectric circuit is broken and the electromagnetic coil 48 is deenergized causing release of the armature 40 whereby the valve member 36 is closed to effect 100% shut off of any fuel flow as described above. As soon as the water temperature decreases to its normal operating range, the contact 154 is again mated with the contact 146, however, to commence operation of the system, the resetting procedure must be repeated as outlined above.

The rod and tube thermostat unit constitutes normal temperature responsive means for effecting thermostatic cycling of the main control means including the valve 90 which is thus moved between controlling positions corresponding to first and second temperature conditions. In the event the main control means fails to cycle properly, the water temperature may be increased to an abnormal or critical temperature condition. Then the abnormal temperature responsive means, constituted by the thermally responsive bimetal housed in the rod and tube, is snapped to cause opening of the thermoelectric circuit which exercises supervisory control of the main control means whereby the system is shut down.

While the above operation has been described in connection with a circuit breaking system, it is to be understood that the bimetal element may also be used to close a normally open switch in a grounding or shorting circuit. Such a grounding circuit is shown in FIG. 6 wherein the conductor 164 is connected to an arcuate conductor 62 between the seat and head members 54 and 56 of the connector 52. In addition, the lead of the electromagnetic coil 48 is connected to a ground terminal 51. With such an arrangement, the abnormal temperature condition would snap the bimetal leaf 142 causing engagement of the contact 154 with the contact 146 whereby the thermoelectric circuit is shortened from the arcuate conductor 62 through the switch assembly to the ground terminal 138; the thermoelectric current flow through the electromagnetic coil 48 is thus reduced sufficiently to cause release of the armature 40 and closure of the valve member 36.

In the above arrangement, the switch means is positioned in the tube 126 with the direction of switch contact opening and closing being perpendicular to the axis of the rod and tube thermostat unit. This has a particular advantage in that the switch mechanism, whether it be snap action or slow make and break, is substantially unaffected by the vibrational effect of the rod and tube thermostat mechanism when it snaps over center. For example, if the switch mechanism or its switching movement is parallel to the rod and tube actuation of the thermostatic valve snap mechanism, the resulting vibration may cause erratic switch opening and closing so that the switch would open below its calibrated temperature.

Inasmuch as the preferred embodiment of the present invention is subject to many variations, modifications and changes in detail, it is intended that all matter contained in the foregoing description or shown on the accompanying drawings shall be interpreted as illustrative and not in a limiting sense.

What is claimed is:
1. A dual thermostatic control device comprising:
   a casing having control means movable between controlling positions,
   a snap acting mechanism for moving said control means between its controlling positions, first temperature sensing means including a rod and tube with the rod longitudinally disposed in the tube in spaced relation thereto, said rod and tube being of different thermally responsive materials and being joined at one end portion whereby said rod is moved longitudinally in response to thermal expansion and contraction of said tube, an opposite end portion of said tube being secured to said casing, an opposite end portion of said rod engaging said snap acting mechanism for actuating the same, second temperature sensing means including a sealed enclosure disposed in said tube in spaced relation to said rod whereby free longitudinal movement of said rod is permitted, and bimetal switch means in said enclosure adapted to actuate a second control means in response to a predetermined second temperature condition, said bimetal switch means including an elongated bimetal actuator leaf having its length disposed on a longitudinal axis in spaced parallel relation to said rod and being actuated perpendicularly to its longitudinal axis whereby said leaf is substantially isolated from vibrational effect transmitted from said snap acting mechanism to said rod.

2. The invention as recited in claim 1 wherein said rod is longitudinally disposed in said tube off center from the longitudinal axis of said tube whereby substantial spacing is provided between the rod and tube for receiving the sealed enclosure.

3. The invention as recited in claim 2 wherein said sealed enclosure has a kidney shaped cross section whereby said sealed enclosure is assembled in nested relation to said rod.

4. The invention as recited in claim 3 wherein said bimetal switch means comprises a conductor bracket having mounting tabs disposed on the longitudinal axis of said actuator leaf, and said actuator leaf is carried by said mounting tabs.

References Cited

UNITED STATES PATENTS

| 3,320,388 | 5/1967 | Kreuter | 200—137 |
|---|---|---|---|
| 2,312,479 | 3/1943 | Ray | 236—21 |
| 2,925,599 | 2/1960 | Wells | 200—136.6 |
| 3,223,806 | 12/1965 | Moro | 200—138.6 |
| 3,231,193 | 1/1966 | Coffey | 236—21 |
| 3,286,923 | 11/1966 | Jackson et al. | 236—21 |
| 3,291,390 | 12/1966 | Solomon | 236—21 |

EDWARD J. MICHAEL, *Primary Examiner.*